July 22, 1941. F. W. SCHWINN 2,249,858
VEHICLE LAMP
Filed May 6, 1939 2 Sheets-Sheet 2
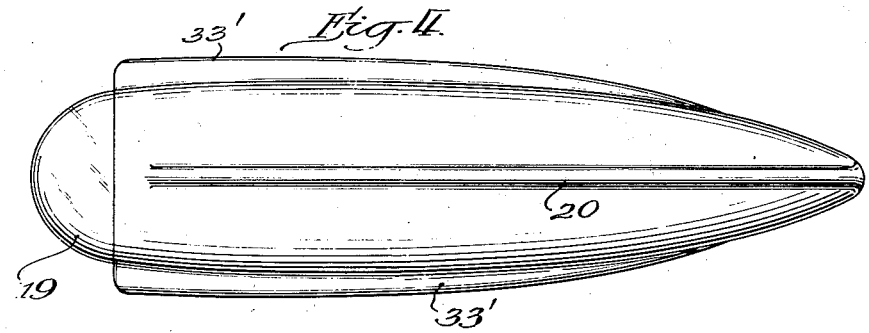
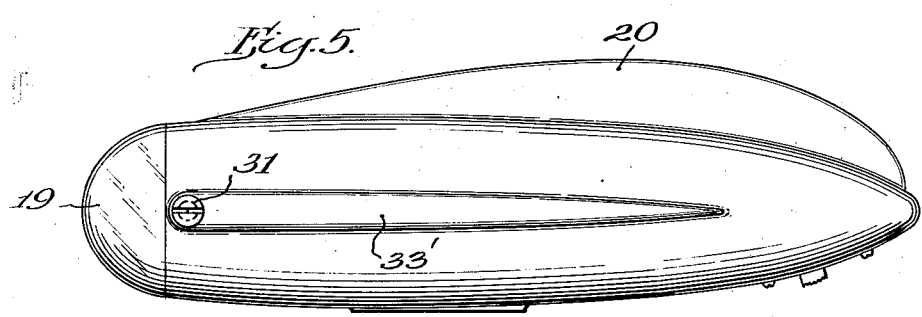
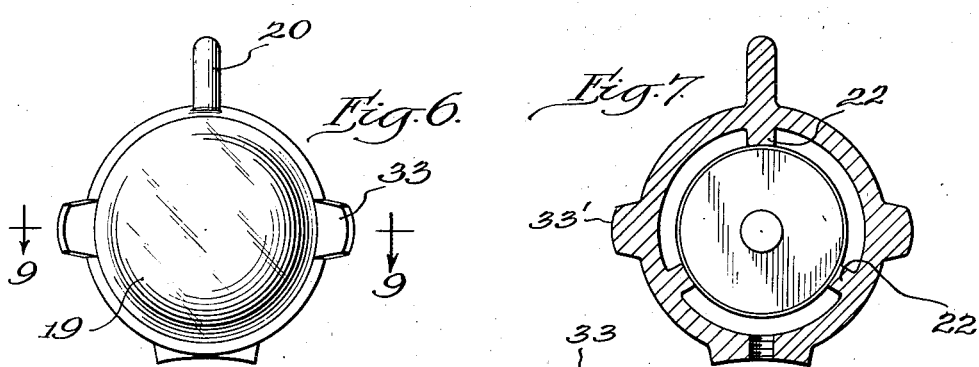
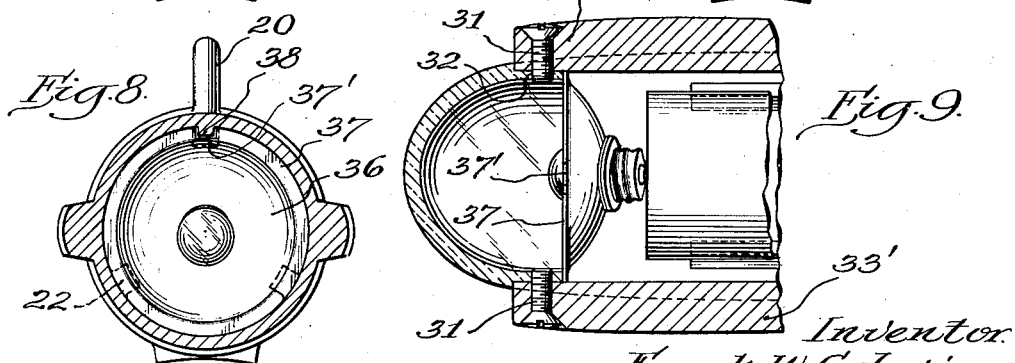
Inventor.
Frank W. Schwinn
By Williams, Bradbury, McCaleb & Hinkle
Attys Patented July 22, 1941

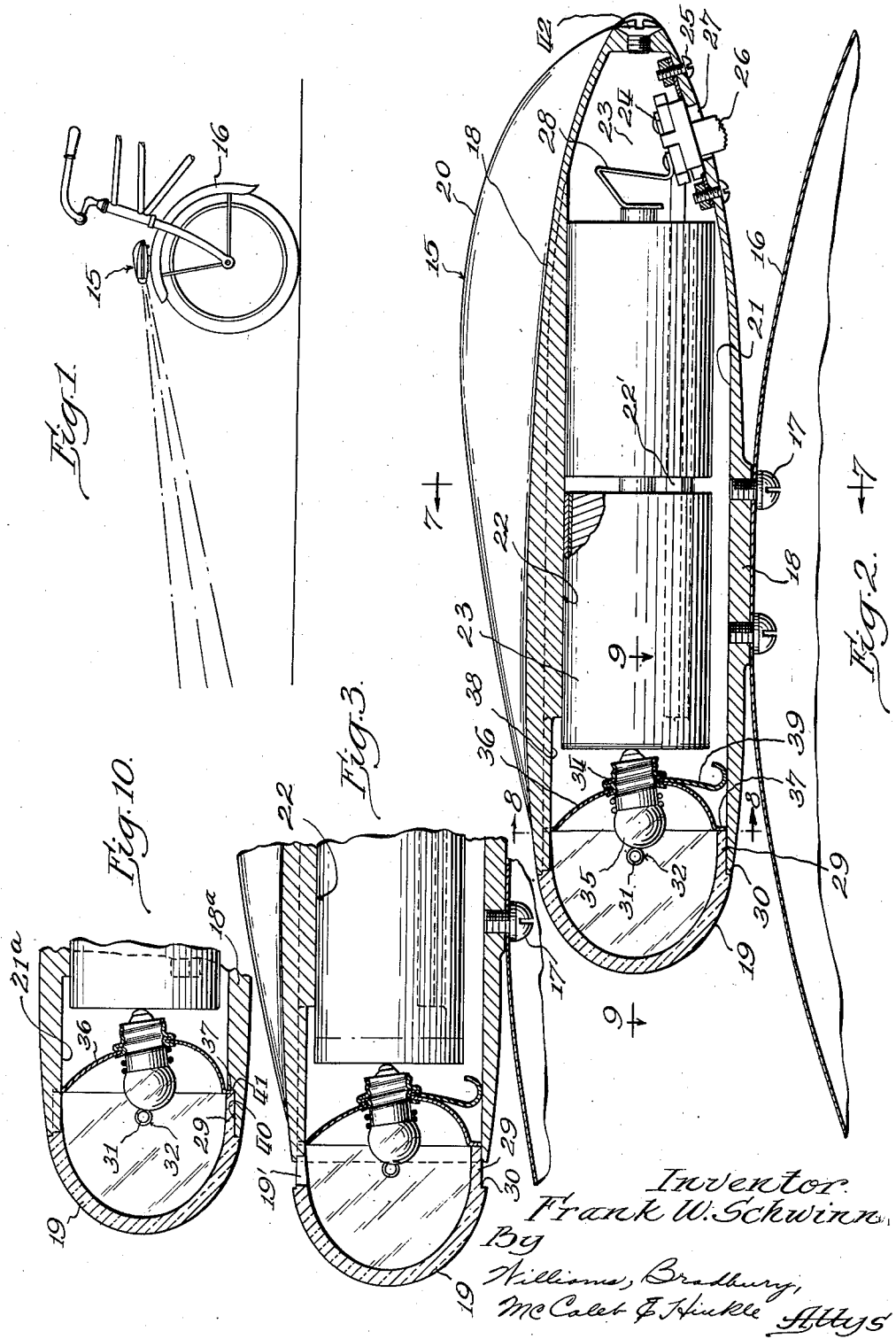

2,249,858

UNITED STATES PATENT OFFICE 2,249,858

VEHICLE LAMP

Frank W. Schwinn, Chicago, Ill.

Application May 6, 1939, Serial No. 272,112

2 Claims. (Cl. 240—7.55)

My invention relates to vehicle lamps, and especially to streamlined lamps for use on bicycles, motorcycles, automobiles and aircraft. It is especially adapted for the type of lamp which is operated by one or more dry cells within the lamp housing, although it is applicable to lamps using outside sources of electric current.

The principal object of my invention is the provision for a mounting of the forwardly convexed lens in such a manner as to eliminate the conventional bezel and to eliminate any shoulder or other break in the streamlining of the outer casing of the lamp where it meets the lens. A subordinate object is to realize this primary objective by a construction which is simple, foolproof, and economical to manufacture.

In previous attempts to solve the problem of preserving the streamlined conformation or contour of the lamp where the lens joins the lamp casing, it has been proposed to sink the bezel so that its outer surface comes in line with the desired streamlined lamp conformation, but this has involved a rather complicated form of bezel and there have inherently had to be two exposed lines representing the front and back edges of the bezel. I propose to eliminate the bezel without complicating the remaining parts.

The foregoing together with further objects, features and advantages of my invention, are set forth in the following description of specific embodiments thereof and illustrated in the accompanying drawings wherein:

Fig. 1 is a side elevation of the front part of a bicycle showing a lamp according to my invention mounted on the front wheel fender;

Fig. 2 is a vertical medial longitudinal section of the lamp of Fig. 1;

Fig. 3 is a fragmentary sectional view of the front end of the lamp, similar to Fig. 2, but showing the lens and other parts at an intermediate stage of application;

Fig. 4 is a plan view of the lamp;

Fig. 5 is a side elevation of the lamp;

Fig. 6 is a front elevation of the lamp;

Fig. 7 is a transverse vertical section taken on the line 7—7 of Fig. 2;

Fig. 8 is a transverse vertical section looking rearwardly and taken along the line 8—8 of Fig. 2;

Fig. 9 is a horizontal section taken on the line 9—9 of Figs. 2 and 6; and

Fig. 10 is a vertical longitudinal section of the front end of a lamp, similar to Fig. 2, but showing a modification.

As shown in Fig. 1, the lamp 15 is mounted on the front wheel fender 16 of a bicycle and is centered a little forward of a position directly over the front axle, with the result that the axis of the lamp is slightly inclined downwardly and forwardly.

As shown in Fig. 2, the lamp 15 is mounted on the fender by a pair of cap screws 17 extending up through the fender 16 and threaded into the bottom side of the lamp casing or shell 18.

In the form here shown, the casing 18 together with the lens 19 is conformed to give the lamp a generally cigar-shaped or elongated teardrop shaped contour, although an ornamental vertical fin 20 may be added to the top side. The casing 18 is open at its front end and has a generally cylindrical bore 21 modified at its rear end to conform to the exterior contour.

A set of three arcuately spaced longitudinal ribs 22 extend inwardly from the wall of the bore 21 to receive rather snugly a pair of dry cells 23 arranged tandemwise. The ribs 22 serve two functions. One is to reduce the surface contact between the casing and the dry cells, so that if the dry cells should corrode and tend to stick to the casing surface, there will be less area of contact to be overcome in removing old cells. The other function is to permit the rearward tapering of the exterior of the shell along the length of the dry cells without requiring so much thickness of metal for the casing near the forward dry cell as would be the case if the entire bore of the casing snugly fitted the dry cells.

At the rear end of the bore 21 and behind the inner dry cell is a hollow space 23 which houses a light controlling switch 24. The switch is mounted by screws 25 passing through the shell, and the switch is controlled by a finger piece 26 which extends through a slot 27 in the shell at its underside and near its rear end, the finger piece 26 being integral with the switch slide. A spring finger 28, which is mounted on the switch and connected to one of its terminals, is bent around hookwise electrically to engage one of the contact surfaces of the adjacent dry cell and to urge the dry cells forwardly.

The lens 19 is more or less semi-cylindrical and has a rearwardly directed annular flange 29 of reduced external diameter to fit within the mouth of the bore 21 of the casing. The reduced diameter of the flange 29 leaves a shoulder 30 which, when the lens is moved rearwardly from the intermediate assembly position of Fig. 3, abuts the forward end of the casing to limit rearward movement of the lens. The exterior conformation of the casing 18 at its forward end, is of the same diameter as the exposed portion of the lens adjacent the shoulder 30, thus avoiding any exposed shoulder or abrupt change in the streamlined contour of the lamp assembly.

The lens is held against outward movement and against rotation by a pair of screws 31, as shown in the plan section of Fig. 9. The screws are preferably countersunk and threaded into diametrically opposed threaded holes in the casing near its front edge, and the inner ends of the screws extend into holes 32 in the flange 29 of the lens. Optionally, the holes 32 can be threaded rather than the holes in the casing, especially if the lens be made of some transparent plastic, such as Lucite, rather than of glass.

The screws 31 may be short enough to be substantially countersunk within the thickness of the shell adjacent its mouth, or, as shown in the drawings, a boss 33 may be provided in the casing for each screw 31. In that case the bosses 33 are preferably extended as tapering beads 33', shown in Figures 4 and 5, to present a more sightly appearance and to facilitate the withdrawal of the casing from the casting mold or die casting die, as the case may be.

The socket 34 for the lamp bulb 35 is conveniently mounted on the reflector 36. The reflector 36 is peripherally flanged, as at 37, to abut against the inner end of the flange 29 to position the reflector and limit its forward movement. The reflector flange 37 is held against the end of the lens flange 29 by pressure of the spring finger 28 exerted through the dry cells and against the center contact of the bulb. Although there is some slight inclination of the axis of the lamp 15, the light beam should have a greater inclination in order properly to illuminate the foreground. It would not look well to give the axis of the lamp itself that much inclination. For this reason, I prefer to incline the axis of the bulb and reflector. This is shown in the non-symmetrical section of Fig. 2.

In order to insure the proper rotary position of the non-symmetrical reflector, I provide a slot 37' in the flange 37 of the reflector 36, as shown in Fig. 8. This slot receives a longitudinal rib 38 carried by the casing and extending into the bore 21. The rib 38 may be a continuation, of reduced cross section, of the top rib 22 of the three ribs 22. The rib 38 and slot 37' cooperate to insure that the inclination of the axis of the lamp and reflector surfaces will cause the beam to be deflected downwardly, rather than upwardly or sidewise. The rib 38 is also received in a slot 19' in the lens flange 29.

Although the peripheral edge of the flange 37 of the reflector contacts the bore of the casing, the contact may not be adequate to rely upon in grounding the lamp socket 34 on the casing 18. I prefer to insure proper contact by other and more formal means, such as a spring finger 39 which resiliently bears against the bore 21. The inner end of the spring finger is shown as forming a ring lying against the margin of the socket hole in the reflector 36 and mounted upon the socket in electrical contact therewith by the same annular crimping which fixes the socket upon the reflector.

The lamp is assembled as follows:

First the switch assembly 24 is inserted through the open end of the bore of the socket and pushed back into position in the rearward space 23 where it is mounted on the interior of the casing by the screws 25 with the finger engaging portion 26 of the switch slide protruding through the slot 27. Then the two dry cells are successively inserted into the bore, riding on the three ribs 22. It is immaterial whether the dry cells are arranged with their center contacts to the front or to the back. Then the assembled reflector 36, socket 34, spring contact finger 39 and lamp bulb 35 are inserted as a unit into the bore to the position shown in Fig. 3, with the rib 38 received in the rim slot 37' of the reflector. Next the flange 29 of the lens is inserted in the bore with the slot 19' of the lens receiving the forward end of the rib 38. The lens is pushed from the position of Fig. 3 rearwardly to the position of Fig. 2. Then the screws 31 are inserted and screwed home. The lens slot 19' and the rib 38 cooperate to insure a rotary position of the lens which brings the holes 32 in register with the holes in the casing for the screws 31.

With the lens held against forward movement by the screws, the other members within the casing are held against rearward movement by the pressure of the spring finger 28, and they are limited in their forward movement by the lens.

The above mentioned assembly may be performed either before or after the lamp is mounted on the bicycle fender. By a partial reversal of this assembly operation, the lamp bulb or the dry cells may be removed for replacement, which is a simple and quick process.

Because the three ribs 22 hold the dry cells spaced inwardly from the bore 21, it is possible with a suitable tool or instrument to reach along the annular space to the back of the dry cell to pull it forwardly if it should become securely lodged. Also, I provide a screw plug 42 in the rear end of the casing which, when removed, permits the insertion of a small rod by which a sticking cell may be pushed forwardly out of the casing.

It will be seen that by my construction I have eliminated the usual bezel as a means of holding the lens on the lamp casing. This not only eliminates one part, but it presents a neater and trimmer streamlined appearance to the lamp. Even if a bezel were set flush with the streamlined contour, two annular lines would have to show. By my construction only one line shows and that would be inherent anyway in the change from the opaque casing to the transparent lens.

In Fig. 10 I have shown a modification in which the bore 21a of the casing 18a is of slightly less diameter, and the front end of the casing is counterbored, as at 40, thereby leaving a forwardly facing shoulder 41. The end edge of the flange 29 of the lens 19 clamps the peripheral flange 37 of the reflector 36 against the shoulder 41, thereby making an electrical contact which will permit of elimination of the spring contact finger 39. For this purpose it may be advisable to make the reflector flange 37 slightly undulating, somewhat after the fashion of the crimping of a piecrust, to afford a certain resiliency of the clamped rim 37 to insure contact without the necessity of too accurate a manufacturing control of the longitudinal dimensions of the lens flange 29 and the counterbore 40. One reason I favor the preferred form rather than the modification of Fig. 10, is that a lesser thickness of the metal in the wall of the casing is permitted if it be die cast or molded.

Having thus described specific embodiments of my invention, I claim:

1. A lamp for bicycles or the like comprising an elongated tubular casing adapted to contain a dry cell and having an open end with a cylindrical bore extending rearwardly therefrom, a lens closing the opening and protruding convexly therefrom, and bezel-less means for mounting the lens in the casing comprising an integral cylindrical flange extending rearwardly from the lens in telescoping relation with the bore of the casing, the flange being of reduced diameter leaving a rearwardly facing shoulder which engages the forward end of the casing to present a single exposed circular line of juncture between the lens and casing, locking means radially insertable from without the casing for engaging the flange interiorly of the casing to hold the lens against forward movement, the locking means comprising a hole extending through the wall of the casing adjacent its front end, an opening in the flange of the lens, and a lens locking member extending through the hole and into the opening, the casing having a longitudinal rib extending inwardly into its interior and the flange of the lens having a slot for receiving the rib as the lens flange is slid into the casing whereby to position the lens in predetermined angular relation to the casing to bring the two holes in register, a reflector extending across the interior of the casing and peripherally abutting the end of the lens flange, and spring means urging the reflector forwardly against the end of the flange, the reflector having a peripheral slot for receiving the rib whereby to predetermine the angular position of the reflector in relation to the casing.

2. A lamp for a bicycle or the like comprising an annular casing for housing a lamp, a reflector, and a dry cell axially aligned with the casing, the casing having a bore extending inwardly from its front edge for insertion of the lamp, reflector and cell, and a lens convexly protruding from the front end of the casing to form a rounded nose for the lamp in stream-lined continuation of the conformation of the casing, the lens having a cylindrical rearward flange of reduced diameter having an annular shoulder of radial thickness agreeing with the thickness of the front edge of the casing and lying substantially thereagainst to leave a single circular line exposed between the lens and casing to the elimination of any bezel, the cylindrical flange being nonrotatably received in the bore by rearward axial sliding movement and fitting the bore to provide a longitudinally deep contact therebetween for mounting the lens, and means releasably accessible from without the casing, but exposed wholly rearwardly of the exposed portion of the lens, and passing through the wall of the casing near its front end into engagement with the lens flange for locking the lens against outward movement, the cell receiving portion of the casing having a set of arcuately spaced longitudinal internal ribs for engaging the periphery of the cell to position it, at least one of the ribs extending forwardly into the flange-receiving region of the bore, and the flange of the lens having a slot for receiving the rib to position the lens in predetermined angular relation to the casing.

FRANK W. SCHWINN.